United States Patent [19]

Tanaka et al.

[11] Patent Number: 4,926,492
[45] Date of Patent: May 15, 1990

[54] OPTICAL CHARACTER READING APPARATUS AND METHOD

[75] Inventors: Hideaki Tanaka, Daoto; Yoshihiko Kitamura, Yamatokoriyama, both of Japan

[73] Assignee: Sharp Kabushiki Kaisha, Osaka, Japan

[21] Appl. No.: 222,782

[22] Filed: Jul. 22, 1988

[30] Foreign Application Priority Data

Jul. 24, 1987 [JP] Japan ................................. 62-186327

[51] Int. Cl.$^5$ ............................................. G06K 9/46
[52] U.S. Cl. ....................................... 382/18; 382/21; 382/24
[58] Field of Search ............................. 382/21, 18, 24

[56] References Cited

U.S. PATENT DOCUMENTS 4,163,214  7/1989  Komori et al. ........................ 382/18
4,757,551  7/1988  Kobayashi et al. .................... 382/18

Primary Examiner—Leo H. Boudreau
Assistant Examiner—Daniel Santos

[57] ABSTRACT

An optical character reader is characterized in that the reader determines accurately the range occupied by the major portion of each character in each character line. This is accomplished by dividing an image read from a document into character lines and counting the number of picture elements in series with each picture element forming each character on each character line in each direction of a plurality of predetermined directions. Each picture element is provided with a code data indicating the direction having the largest number of picture elements having a character. If the picture elements between two picture elements allotted with a specific code data for the direction along each character line do not have the specific data code, the original code data is replaced with the specific code data. The number of picture elements allotted with the specific code data for each character line are then counted and the position with the largest number of picture elements having a character is detected.

2 Claims, 8 Drawing Sheets

```
       1st          8th
    column  →    column
                    ↓
             2   31    4314442
       142222  4334442 44444442
3rd → 4422222243444444422  11222
line  42222222222222243 11222 33 1222
      222222  11222 22222 2222  2222
      22222  122223 22222 2222  2222
      22222 22222  22221 22222  2222
      22222 22222  2222  2222   2222
      22222 22222  2222  2222   2222
      22222 22222  2222  2222   2222
      22222 22222  2222  2222   2222
      22222 22222  2222  2222   2222
      22222 22222  2222  2222   2222
      22222 22222  2222  2222   2222
      422222 422222 422224 422224 422224
      44422222244 44422222244 44422222244 442222244
      44222222244 44222222244 44222222244 44222222244
```

```
1st column →
1st line →
3rd line →
              ℓ5
```

```
                ..         ..          .
        a......aaaaaa.          aaaaaa.
    aaaaaaaaaaaaaa..          aaaaaa..         ————————
                                                       \
        ......      ......            .....            \
        .....       ......            ....             ℓ12
        .....       ......            ....
        .....       ....a             ....
        .....       .....             ....
        .....       .....             ....
        .....       .....             ....
      ..           .....             ....
        .....       .....             ....
        .....       .....             ....
        .....       .....             ....
        .....       .....             ....
        .....       .....             ....
        .....       .....             ....
        .....       .....             ....
        .....       ....a             ....
      aaaaaa       aaaaaa           aaaaaa       ℓ11
      aaaaaaa    aaaaaaaa         aaaaaaaa    ————
    aaaaaaaa      aaaaaaa          aaaaaaa
```

OPTICAL CHARACTER READING APPARATUS AND METHOD

BACKGROUND OF THE INVENTION

The present invention relates to an optical character reader (OCR) and an optical character reading method.

Conventionally, an optical character reading apparatus is used as a data input means for computers. The conventional apparatus reads an image from a document by exposing the document with the light irradiated from a light source and inputs information constituting the read image, i.e., information identifying the kind of the character (alphanumeric or symbol). For inputting various characters, the optical character reading apparatus divides the read image into character lines to detect a space between character lines thereby allowing the identification of each character on each line.

To make a discrimination between a capital letter and the corresponding small letter of a similar shape (such as between "C" or "c" or "S" and "s") and between similar symbols (such as between "." and ".") and to identify a space between words, the conventional apparatus uses the concept of base lines. FIG. 13 is an illustration for explaining this concept.

Basically, alphabets, numerals and symbols (hereinafter referred to as characters) are written with their bottom portion flush with a hypothetical line 11. Although characters "p" and "y" project below line 11, the major portions of them rest on the line 11. Characters "t" and "h" project upward from another hypothetical line 12, but the major portions of these characters are located under the line 12. In other words, the major portion of each character is written between the hypothetical lines 11 and 12. The hypothetical lines 11 and 12 are referred to below as common lines.

According to the concept of base lines, another hypothetical line 13 is located below the common line 11, and still another hypothetical line 14 which is located above the common line 12. The hypothetical lines 13 and 14 define the lower and upper limit positions, respectively, of each character written.

By detecting the common lines 11 and 12, it is possible to discriminate between similar capital and small letters and identify symbols.

Conventionally, there are two methods of detecting these base lines. The first method relies on a histogram for the horizontal direction (of FIG. 13) of the picture elements which constitute the character lines shown in FIG. 13. An example of the histogram is shown in FIG. 14. The second method relies on the area occupied by the smallest character of a character line as is shown in FIG. 13.

In the first method, since the obtained histogram does not show peaks clearly as shown in FIG. 14, it is difficult to determine base lines. In the second method which is based on the assumption that each character on each line is identified accurately, it is impossible to determine base lines correctly if a character is identified incorrectly.

SUMMARY OF THE INVENTION

Accordingly, it is an object of the present invention to provide an improved optical character reader which is capable of detecting accurately the area occupied by the major portion of each character on each character line.

It is another object of the present invention to provide an improved optical character reading method for detecting accurately the area occupied by the major portion of each character on each character line.

Briefly described, in accordance with the present invention, an optical character reader reads an image on a document and divides the read image into character lines; counts the number of picture elements existing in series, in each of a plurality of predetermined directions from each picture element forming each character on each character line; provides each picture element with a code data indicating the direction having the largest number of picture elements; replaces the code data of the picture elements existing between two picture elements allotted with a specific code data for the direction along a character line if the code data continually exist between the two picture elements with the specific code data; counts the number of picture elements allotted with the specific code data for each character line; and detects the position with the largest number of picture elements.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 7 shows the distribution of the number of picture elements in the character of FIG. 6, scanned in four different directions;

FIG. 10 is an example of the character obtained after "cutting" is corrected; FIG. 11 shows the state in which the picture elements with the direction code "4" in FIG. 10 are extracted;

DESCRIPTION OF THE PREFERRED EMBODIMENT

Figure 1:
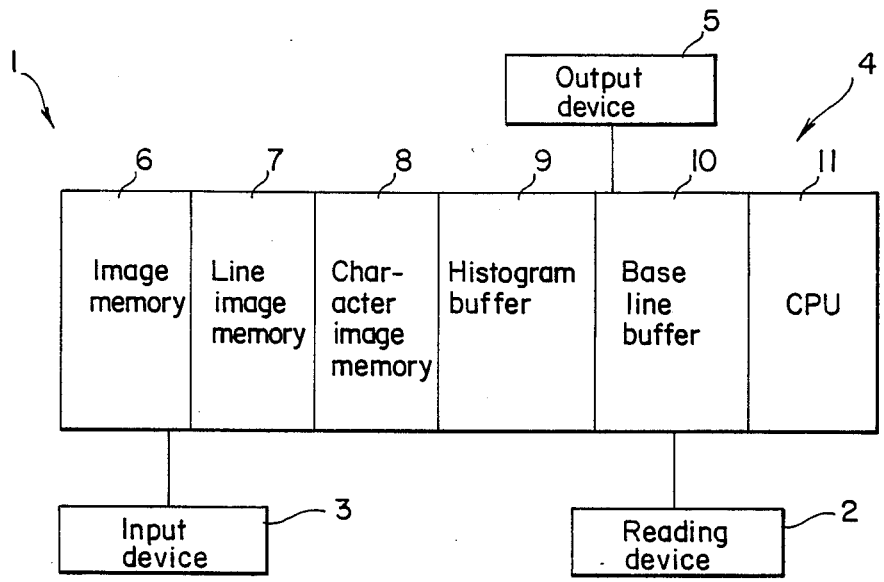
FIG. 1 is a block diagram showing the basic configuration of an optical character reader 1 of an embodiment of the present invention.

FIG. 1 is a block diagram showing the configuration of an optical character reader 1 according to the present invention. The character reader 1 comprises reading means 2 for reading an image on a document optically preferably using a solid state imaging device; input means 3 such as a keyboard for inputting various data and control information, a controller 4 to which signal outputs from the reading means 2 and the input means 3 are inputted; and an output device 5 such as a cathode ray tube (CRT) or a printer.

The controller 4 comprises an image memory 6 for storing the image read by the reading means 2; a line image memory 7 for storing each character line (a character group along the horizontal scanning direction) called from the image stored in the image memory 6, a character image memory 8 for storing each character of each character line stored in the line image memory 7, a histogram buffer 9 for storing a histogram (described later), a base line buffer 10 for storing extracted base lines, and a central processing unit (CPU) 11 for controlling the operation of the above components.

Figure 3:
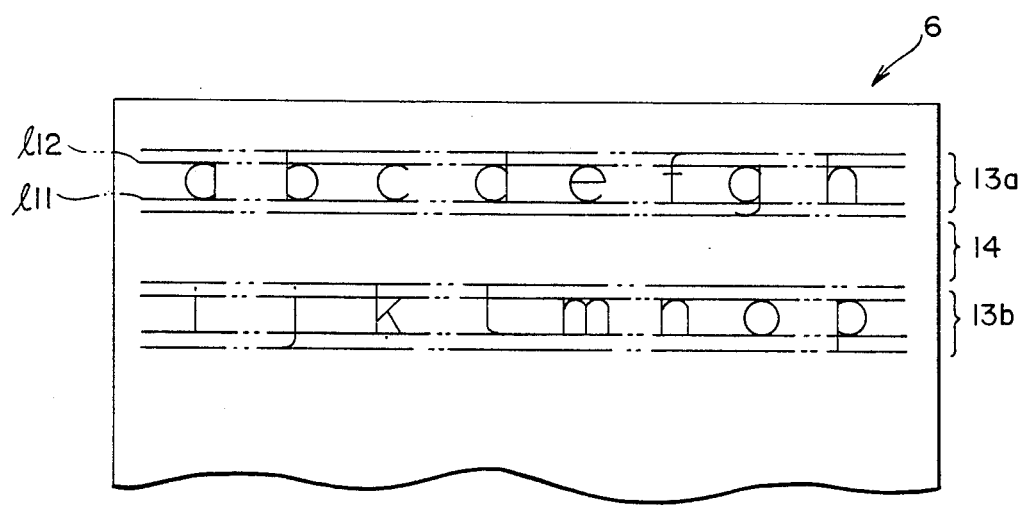
FIG. 3 is an illustration for explaining the reading operation.
Figure 2:
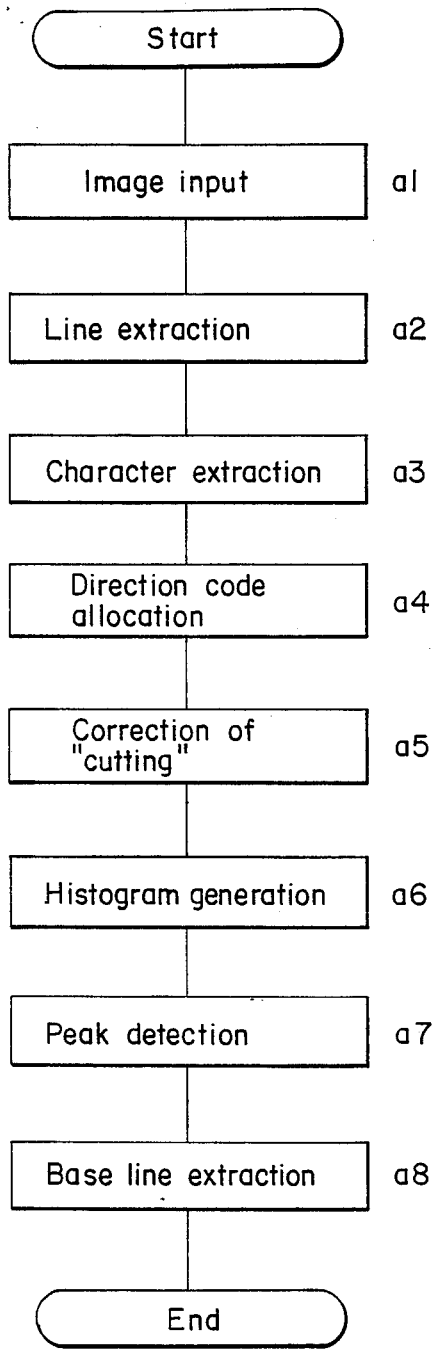
FIG. 2 is a flow chart showing the basic operation of the present embodiment.

FIG. 2 is a flow chart explaining the basic operation of the reader 1 shown in FIG. 1, and FIG. 3 is an illustration for explaining the reading operation. The basic operation of the reader 1 is explained now with reference to FIGS. 1 through 3. In step a1 of FIG. 2, an image is read and inputted by the reading means 2 of the reader 1. The image thus inputted is stored as shown in FIG. 3, in the image memory 6. In step a2, the CPU 11 detects a space 14 between every two adjacent character lines 13a, 13b, . . . (General character lines are referred to by 13.) As shown in FIG. 3, the image data is stored in the image memory 6, so as to extract each character line of the image data. Each character line thus extracted is stored in the line image memory 7.

In step a3, characters are separated one by one from each character line stored in the line image memory 7, and in step a4, direction codes are applied to each character as described later. In step a5, "cutting" (described later) is corrected. A histogram is generated (as described later) for each character line 13 in step a6, and peaks of each histogram are detected in the step a7. In step a8, the CPU 11 extracts base lines having the characteristic detected based on the detected peaks.

Figure 4:
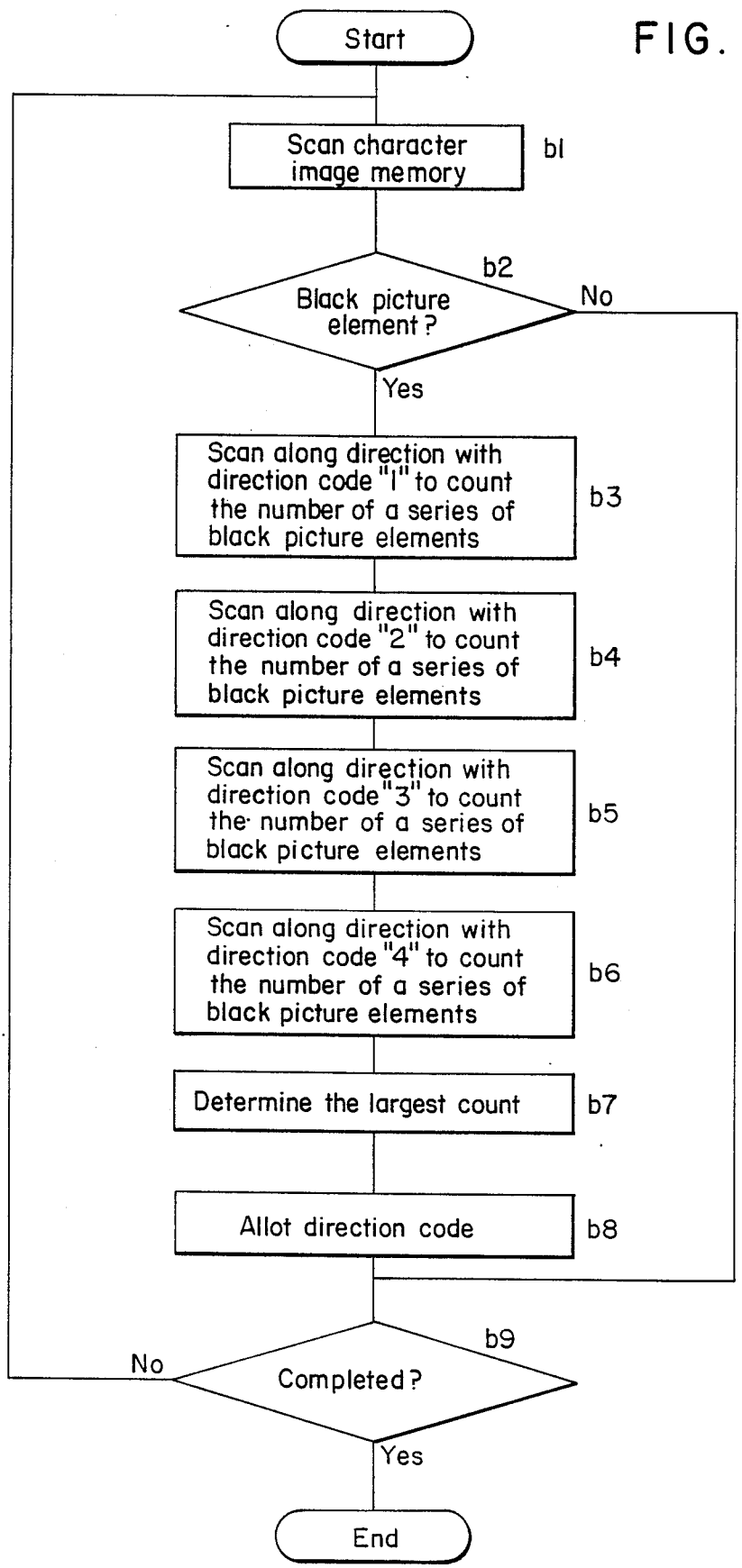
FIG. 4 is flow chart for explaining in detail the direction code allotting operation of the step a4 in the flow chart of FIG. 2.
Figures 5, 6, 8:
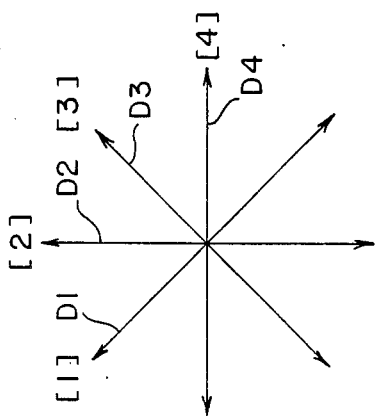
FIG. 5 is an illustration for explaining direction codes.
FIG. 6 is an example of a character.
FIG. 8 shows the character each of whose picture elements is replaced with a direction code having the largest number at the corresponding picture element position in FIG. 7.

FIG. 4 is a flow chart explaining the detail of the direction code allotting operation of the step a4 of FIG. 2. FIG. 5 shows four directions of scanning each character, and each two adjacent directions forming an angle of 45°. FIG. 6 shows an example of a character stored in the character image memory 8. This example is a character "m" composed of 33×20 dots. In step b1 of FIG. 4 the dots on the first line are scanned from the first to the 33rd columns for the character "m".

In step b2, the CPU 11 judges whether or not each dot scanned corresponds to a picture element forming the character (a dot forming a character is called below a black picture element). When the picture element forms a character, the operation process goes to the step b3 where the scanning operation is performed in the direction of D1 (See FIG. 5.) of the four scanning directions from the black picture element to detect the number of black picture elements existing with series in this direction. (Each scanning direction is identified by direction code D,D=1, 2, 3 or 4). The step b4, scanning in the direction D2 is performed from the same black picture element to count black picture elements existing with series in this direction, and in steps b5 and b6, scanning operation is performed in the directions D3 and D4, respectively, from the same black picture element, to count black picture elements existing with series in these directions.

FIGS. 7 (1) through 7 (4) show the numbers of black picture elements counted in the directions D1, D2, D3 and D4, respectively, for the 5×5 dots, enclosed in the hypothetical line 5, of the character "m" shown in FIG. 6. For example, for the black picture element on the first column of third line, the number of black picture elements in the direction D1 of FIG. 5 is seven, and the number of black picture elements in the direction D2 is two.

In step b7 of FIG. 4, the CPU 11 decides the direction having the largest count for each picture element. For example, the largest count for the picture element on the first column of the third line is "16" for the direction D4. In step b8, the picture element is allotted with direction code "4" according to the decision in the step b7.

In step b9, it is judged whether or not the above procedure from the steps b1 through b8 has been completed for all the picture elements of the character. If all picture elements have been processed, the operation process ends. If there are picture elements unprocessed, the process returns to step b1. In the above process, if the judgement at step b2 is negative, the process jumps directly to step b9.

FIG. 8 shows the result obtained by the direction code allotting operation of the step a4 of FIG. 2.

As shown in FIG. 8, the data related to the direction code "4" for the direction D4 of FIG. 5, which is necessary to obtain a histogram for the direction along the character line (horizontal direction of FIG. 3), is "cut" by direction code "2". To correct this "cut" state, the operation for correcting "cutting" is carried out in step a5 of FIG. 2.

Figure 9:
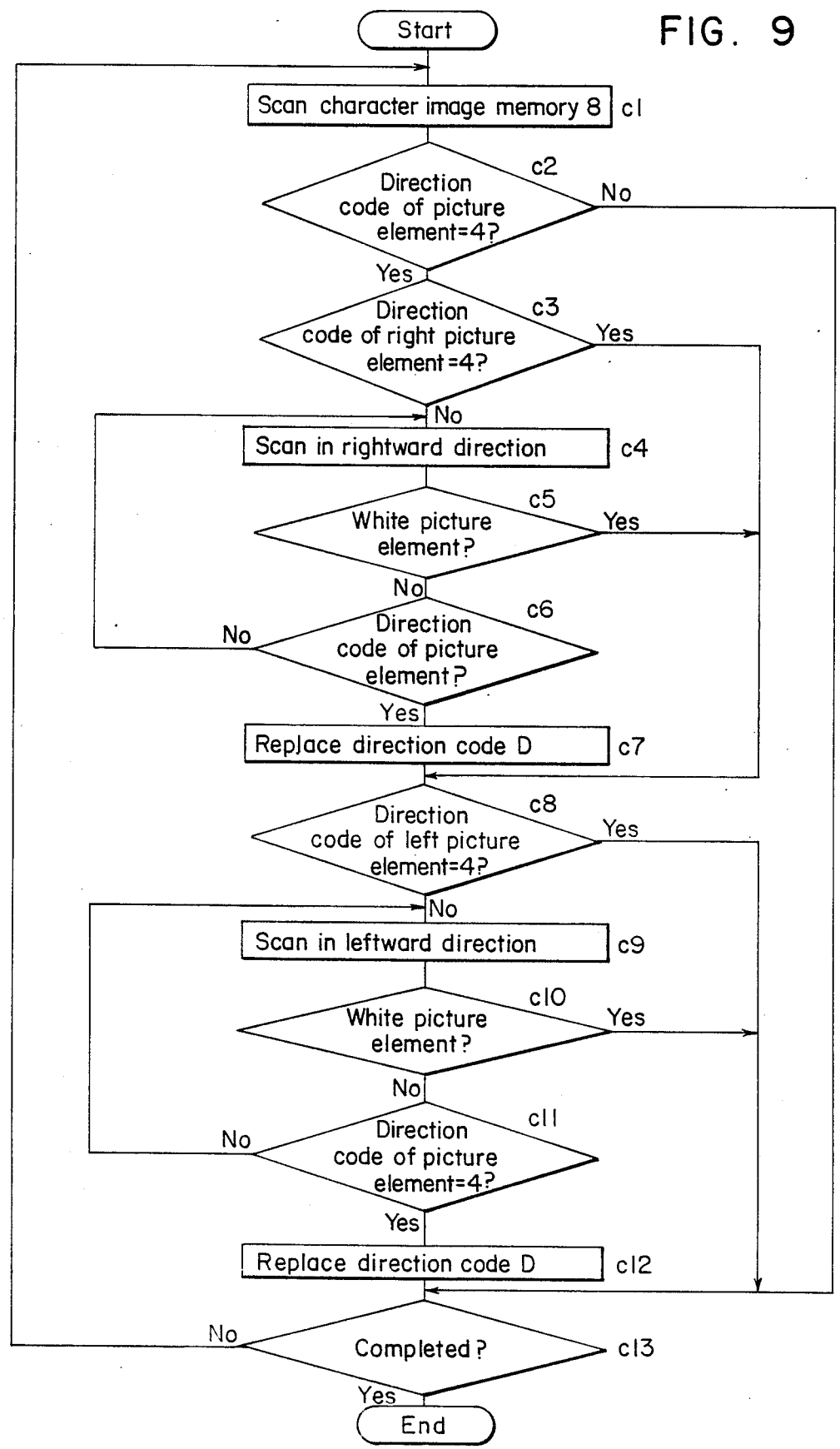
FIG. 9 is a flow chart for explaining in detail the operation for correcting "cutting" of the step a5 in the flow chart of FIG. 2.

FIG. 9 is a flow chart explaining the process for correcting "cutting". In step c1 of FIG. 9, the character data stored as shown in FIG. 8 in the character image memory 8 is scanned. In step c2, it is judged whether or not the picture element scanned is allotted with a direction code "4". For the picture element on the second column of the third line in the character shown in FIG. 8, for example, this judgement is affirmative.

When the judgement of the c2 is affirmative, the operation process goes to step c3 where it is judged whether or not the picture element to the right (of FIG. 8) of the first picture element is allotted with direction code "4". For example, if in step c2 of the picture element on the second column of the third line in FIG. 8 is determined to have a direction code "4", judgement is made for the picture element on the third column of the third line in step c3. Since the direction code applied to this picture element is "2" as shown in FIG. 8, the judgement result for step c3 is negative, so the process moves to step c4 where the next right picture element is scanned.

In step c5, it is judged whether or not the scanned picture element (on the fourth column of the third line in FIG. 8) is a white picture element. In the character example shown in FIG. 8, this picture element is not a white one but is allotted with direction code "2". Therefore, the judgement result of step c5 is negative, and the process moves to the step c6. Since the judgement result of step c6 is negative, the process returns to step c4. The similar scanning operation is continued to the right as long as the picture element scanned is a black picture element and allotted with a direction code other than "4". For example in scanning the picture elements on the third line of FIG. 8, judgement result of step c6 becomes affirmative at the first time for the picture element on the eighth column. So, the process moves to step c7.

In step c7, the direction codes other than "4" allotted to the picture elements between the picture element with direction code "4" are detected in step c6 and the picture element with direction code "4" detected in step c2 are replaced with "4". Upon completion of this replacement, the process goes to step c8 where it is judged whether or not the picture element on the left is allotted with direction code "4".

When the judgement of step c3 is affirmative, the picture element to the right of the picture element being scanned has been allotted with direction code "4". In this case, the process jumps to step c8. When the picture element to the right of the picture element being scanned is a white picture element, the judgement result of step c5 is affirmative. In this case as well, the process jumps from step c5 to the step c8.

At this stage, the picture element on the eighth column of the third line of FIG. 8 has been scanned and the direction codes of the picture elements on the left has been replaced by "4". Therefore, the judgement result of step c8 is affirmative. If the judgement of step c8 is negative, the process moves to step c9 where the next left picture element is scanned, and in the step c10, it is judged whether or not this picture element is a white one. If this judgement is negative, the process goes to step c11 where it is judged whether or not this picture element is allotted with direction code "4". In the case of a negative judgement, the process returns to the step c9 to scan the next left picture element. If judgement result of step c11 is affirmative, the process moves to the step c12 to carry out the same direction code replacement operation as in the step c7.

After this, the process goes to step c13 to make judgement as whether the above operation has been completed for all the picture elements of the character of FIG. 8. If the judgement is affirmative the operation for correcting "cutting" ends. If the judgement is negative the process returns to step c1 to continue the process. If the direction code of the starting picture element is not "4" in step c2, the process jumps directly to step c13. When the judgement result in steps c8 and c12 are affirmative, the process also jumps directly to step c13.

FIG. 10 shows the direction codes of all the picture elements of the character shown in FIG. 8 after being subjected to the operation for correcting "cutting". According to the comparison of the direction codes between the example of FIG. 8 and the example of FIG. 10, it is understood that, where there is a direction code "4" on both sides of a series of direction codes other than "4" in the horizontal direction in FIG. 8, the series of the direction codes are all replaced by "4" in FIG. 10.

FIG. 11 is an illustration in which the direction codes "4" in FIG. 10 are replaced by "a" and other direction codes replaced by ".". According to the present invention, as clear from FIG. 11, it is possible to determine the base lines 111 and 112 shown in FIG. 3 which define the range where the major portion of the character "m" is included.

Figure 12:
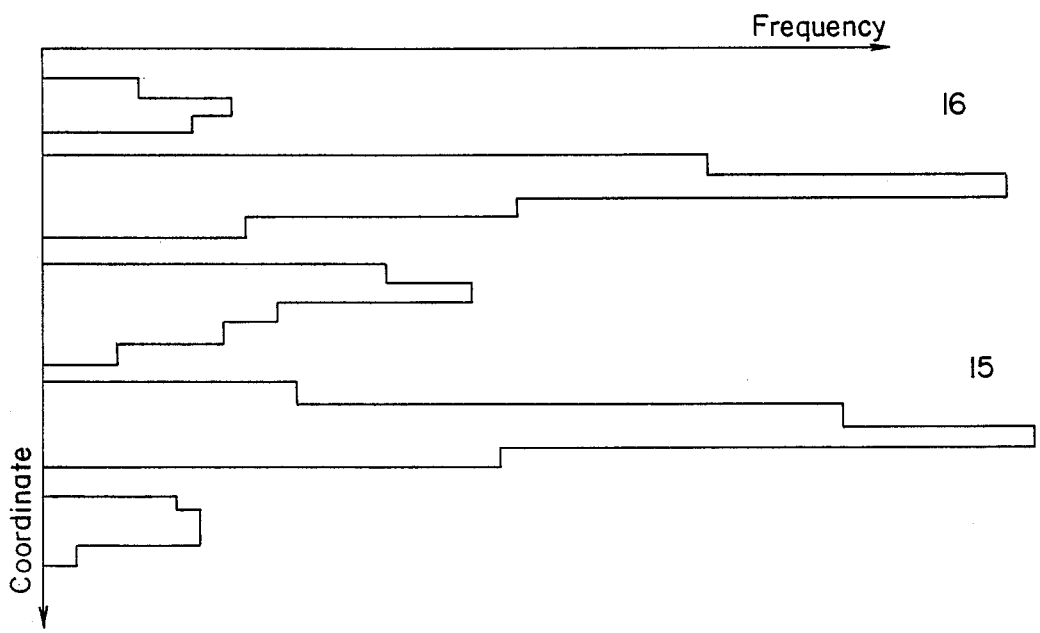
FIG. 12 shows an example of histogram generated according to the present invention.
Figure 13:
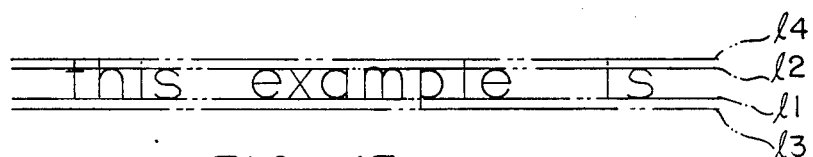
FIG. 13 is an illustration for explaining base lines.

FIG. 12 shows an example of histogram generated for a character line processed by the operations shown in FIGS. 2, 4, and 9. The histogram of FIG. 12 is obtained by accumulating such output as shown in FIG. 11.

Figure 14:
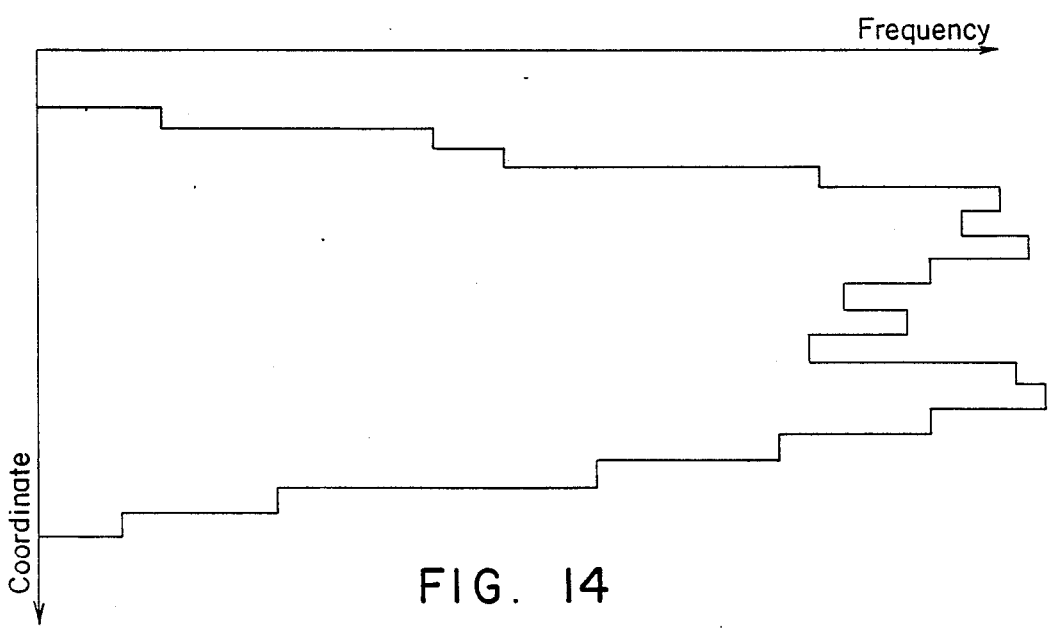
FIG. 14 shows an example of histogram generated according to the conventional art.

Compared with the histogram obtained by the conventional art as shown in FIG. 14, the histogram obtained by the present invention provides more conspicuous peaks 15 and 16.

According to the present invention, as understood from the above, the base lines 111 and 112 can be determined accurately, allowing the character reader 1 to identify characters accurately.

Thus, according to the present invention, it is possible to accurately define the range occupied by the major portions of characters in each character line. Consequently, it is possible to improve the operationability and the capability of identifying characters of a character reader.

While only certain embodiments of the present invention have been described, it will be apparent to those skilled in the art that various changes and modifications may be made therein without departing from the spirit and scope of the present invention as claimed.

What is claimed is:

1. An optical character reading comprising:
   means for dividing an image read from a document into character lines;
   means for counting a number of picture elements in series with each picture element forming each character on each character line for each direction of a plurality of predetermined directions;
   means for providing each picture element with a code data indicating a direction having a largest number of picture elements forming a character;
   means for replacing said code data of a series of picture elements between two picture elements being allotted with a specific code data in the direction along each character line with said specific code data of the two picture elements;
   means for counting a number of picture elements allotted with said specific code data for each character line; and
   means for detecting a position with a largest number of picture elements forming a character.

2. A method of optionally reading characters, comprising the steps of:
   (a) dividing an image read from a document into character lines;
   (b) counting a number of picture elements in series with each picture element forming each character on each character line in each direction of a plurality of predetermined directions;
   (c) providing each picture element with a code data indicating a direction having a largest number of picture elements forming a character.
   (d) replacing the code data of a series of picture elements between two picture elements being allotted with a specific code data from the direction along each character line with the specific code data of the two picture elements;
   (e) counting a number of picture elements allotted with the specific code data for each character line; and
   (f) detecting a position with a largest number of picture elements forming a character.

* * * * *

UNITED STATES PATENT AND TRADEMARK OFFICE
CERTIFICATE OF CORRECTION

PATENT NO. : 4,926,492
DATED : May 15, 1990
INVENTOR(S) : Hideaki TANAKA, Yoshihiro KITAMURA It is certified that error appears in the above-identified patent and that said Letters Patent is hereby corrected as shown below:

Change the first named Inventor's residence from "Daoto-shi" to
--Daito --.

Signed and Sealed this

Twenty-fourth Day of May, 1994

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 4,926,492
DATED : May 15, 1990
INVENTOR(S) : Hideaki TANAKA, Yoshihiro KITAMURA It is certified that error appears in the above-indentified patent and that said Letters Patent is hereby corrected as shown below:

Title page, item [75],
Change the second named Inventor's first name from

"Yoshihiko" to --Yoshihiro--

Signed and Sealed this

Nineteenth Day of July, 1994

BRUCE LEHMAN

*Attest:*

*Attesting Officer*          *Commissioner of Patents and Trademarks*